(12) United States Patent  (10) Patent No.: US 8,730,043 B1
Guincho et al.  (45) Date of Patent: May 20, 2014

(54) CREDIT CARD HOLDING DEVICE WITH SECURITY SYSTEM

(76) Inventors: Carl D. Guincho, Mooresville, NC (US); Ericka C. Guincho, Mooresville, NC (US)

( * ) Notice: Subject to any disclaimer, the term of this patent is extended or adjusted under 35 U.S.C. 154(b) by 621 days.

(21) Appl. No.: 13/020,360

(22) Filed: Feb. 3, 2011

(51) Int. Cl.
| G08B 13/14 | (2006.01) |
| G06Q 20/00 | (2012.01) |
| G06Q 30/00 | (2012.01) |
| G07F 7/00  | (2006.01) |
| G07F 7/08  | (2006.01) |

(52) U.S. Cl.
USPC ........ 340/568.7; 340/5.53; 340/5.83; 726/34; 726/9; 235/380; 235/375; 705/67; 705/65; 705/50

(58) Field of Classification Search
USPC ......... 340/5.53, 568.7; 726/34, 9; 705/50, 67, 705/41
See application file for complete search history.

(56) References Cited

U.S. PATENT DOCUMENTS

| 4,852,727 | A | 8/1989 | Oberle |
| D408,438 | S | 4/1999 | Matsubara et al. |
| 6,263,090 | B1 | 7/2001 | Scott et al. |
| 6,950,540 | B2 | 9/2005 | Higuchi |
| 7,360,688 | B1* | 4/2008 | Harris ........................... 235/380 |
| 8,011,588 | B2* | 9/2011 | Kon et al. ...................... 235/486 |
| 2002/0111918 | A1* | 8/2002 | Hoshino et al. ................. 705/65 |
| 2003/0055785 | A1* | 3/2003 | Lahiri ............................. 705/41 |
| 2009/0050689 | A1* | 2/2009 | Sako et al. ..................... 235/375 |
| 2009/0066478 | A1 | 3/2009 | Colella |
| 2009/0077675 | A1* | 3/2009 | Cabouli .......................... 726/34 |
| 2009/0204539 | A1* | 8/2009 | Parker ............................ 705/41 |

* cited by examiner

*Primary Examiner* — Fekadeselassie Girma

(57) ABSTRACT

A card holding device featuring a housing with a plurality of slots in the top panel that allow passage of credit cards. Card holding mechanisms are disposed in the housing, which engage the credit cards. The card holding mechanisms can store the cards or eject the cards when activated. The card holding mechanisms can be locked and unlocked via a biometric scanner. Disposed on the housing is a display adapted to display the names or icons of each credit card stored in the device. When a user presses the icon, the card holding mechanism is activated and ejects that specific credit card from the housing.

3 Claims, 7 Drawing Sheets

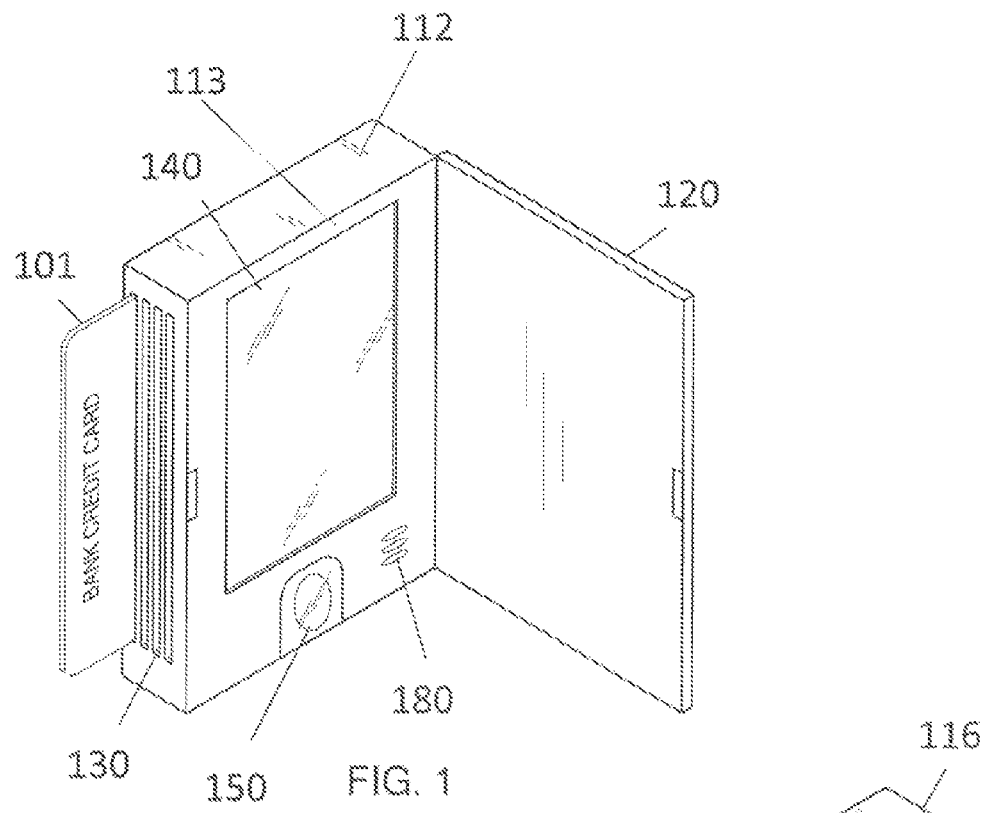
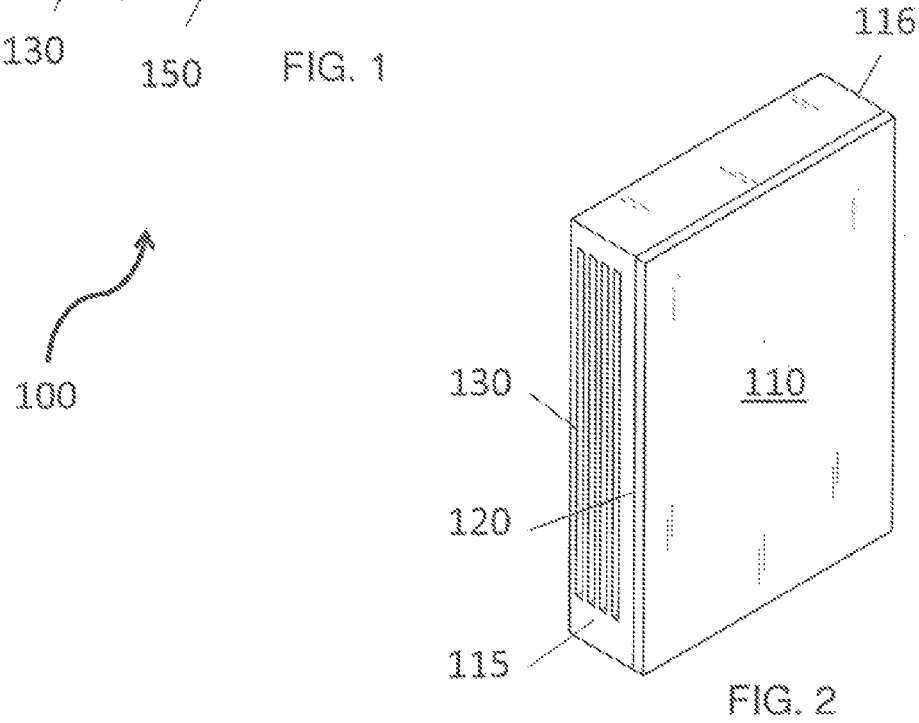

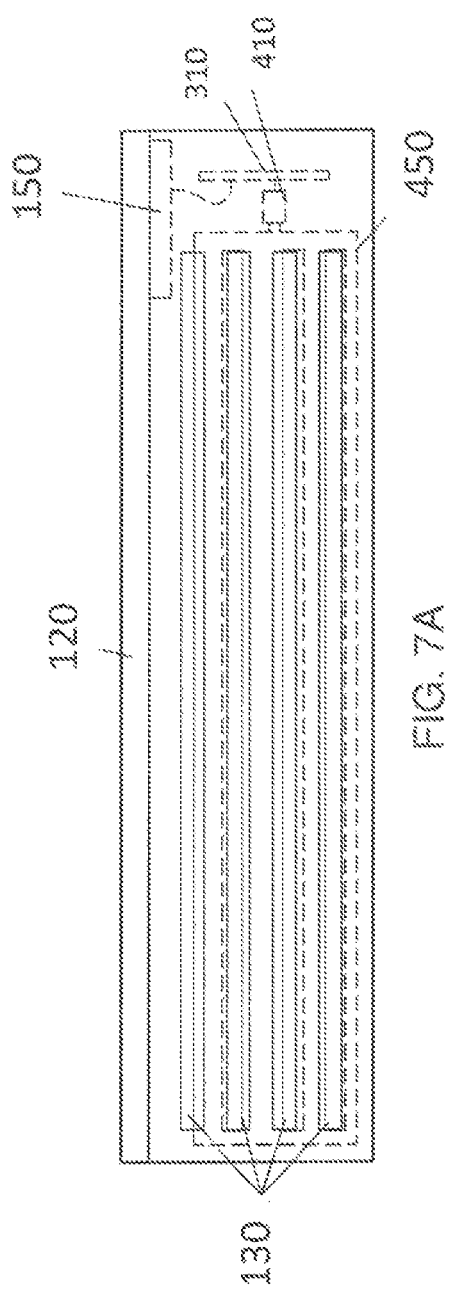
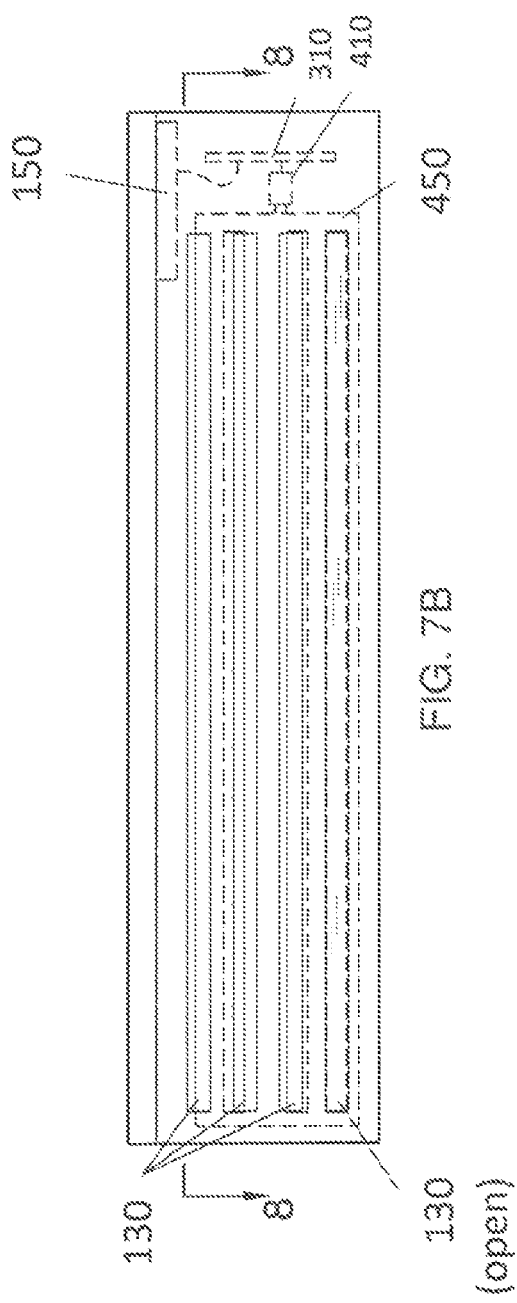

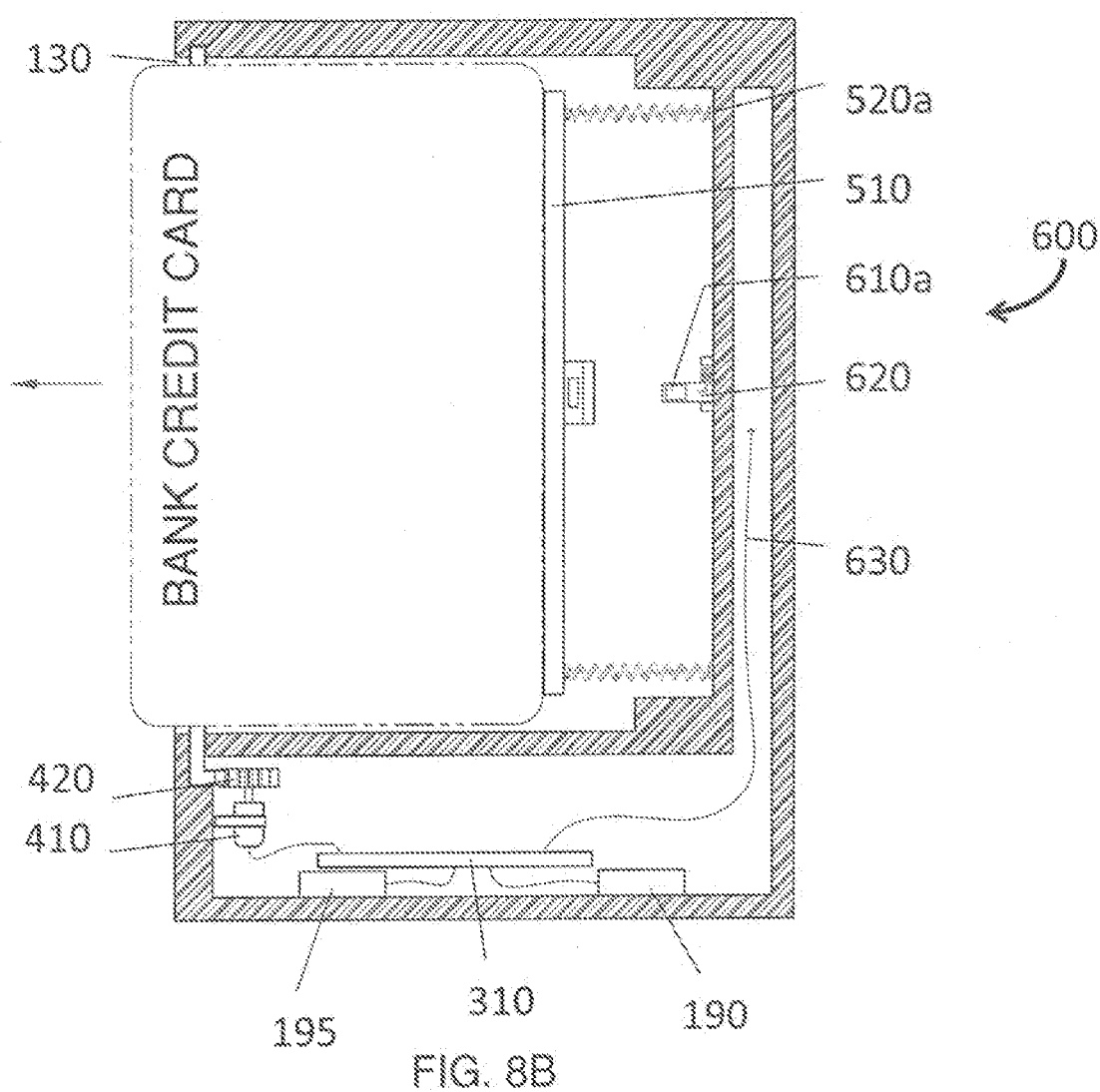

CREDIT CARD HOLDING DEVICE WITH SECURITY SYSTEM

FIELD OF THE INVENTION

The present invention is directed to a wallet or credit card holding device, more particularly to a wallet or credit card holding device with an electronic security system that allows access only to the wallet's owner.

BACKGROUND OF THE INVENTION

Credit cards and other identification cards are subject to a great deal of wear and tear in a traditional wallet. Furthermore, traditional wallets do not provide a means of protecting such cards from thieves. The present invention features a card holding device with security features for helping to secure and organize credit cards (e.g., electronically securing the cards). The device of the present invention also helps prevent wear and tear. The device is water tight and water resistant. The device is activated by electronic identification of the owner. In some embodiments, the device has a unique bar code and a user can call a number (e.g., a 1-800 number) to help retrieve his/her device.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a card holding device. In some embodiments, the device comprises a housing having a front panel, a back panel, a first side panel, a second side panel, a top panel, and a bottom panel, which together form an inner cavity; a door pivotally attached to the front panel of the housing: a first slot disposed in the top panel of the housing; a microprocessor disposed in the housing; and a locking plate disposed in the inner cavity of the housing near the first slot. The door can pivot between at least a first position wherein the door covers the front panel and a second position wherein the door is pivoted away from the front panel such that the front panel is completely visible. The first slot is sized to allow passage of a card into and out of the inner cavity of the housing. The locking plate can move between at least an open position and a closed position respectively allowing and preventing access to the inner cavity of the housing via the first slot. The locking plate is operatively connected to a motor disposed in the inner cavity of the housing, the motor being operatively connected to the microprocessor.

The device may also comprise a biometric scanner disposed on the housing, wherein the biometric scanner is programmed to recognize a fingerprint of a user. The biometric scanner is activated upon recognition of the fingerprint, wherein when the biometric scanner is activated, the biometric scanner sends an activation input signal to the microprocessor whereupon the microprocessor sends a first motor output signal to the motor to cause the motor to move the locking plate from the closed position to the open position.

The device may also comprise a first card holding mechanism disposed in the inner cavity of the housing adapted to engage a cards when inserted via the first slot into the inner cavity of the housing and a display disposed in the front panel of the housing. The display is operatively connected to the microprocessor. The display is adapted to display a name or an icon for the first slot, wherein when a user touches the name or the icon, the display sends a display input signal to the microprocessor whereupon the microprocessor sends a first eject output command to the locking mechanism to cause the locking mechanism to release the holding bar from the locked position thereby allowing the holding bar to move to the unlocked position to eject a card held by the holding bar. The first card holding mechanism may comprise a holding bar adapted to temporarily hold a card. The holding bar may be attached to a side wall of the inner cavity of the housing via a first spring (the side wall being opposite the first slot). The holding bar can move between at least a locked position positioned near or at the side wall of the inner cavity of the housing and an unlocked position moved towards the slots opposite the side wall of the inner cavity of the housing. The holding bar is biased in the unlocked position caused by the first spring. The device may comprise a locking mechanism functioning to secure the holding bar in the locked position.

In some embodiments, the holding bar is attached to the side wall of the inner cavity of the housing via a first spring and a second spring. In some embodiments, the locking mechanism comprises a latch with a latch slot (wherein the latch is disposed on the holding bar) and a hook disposed on the side wall of the inner cavity of the housing. The hook can pivot between at least an engaged position wherein the hook engages the latch via the latch slot and a disengaged position wherein the hook is pivoted away from the latch and can cannot engage the latch slot. When the hook engages the latch, the holding bar is secured in the locked position. In some embodiments, a first magnet is disposed on the hook, and a second magnet is fixedly attached in the inner cavity of the housing near the first magnet. The second magnet is operatively connected to the microprocessor. When the microprocessor receives the display input signal from the display, the microprocessor sends a magnet activation output command to the second magnet causing activation of the second magnet. Activation of the second magnet causes the first magnet and second magnet to be attracted to each other. When the magnets are attracted to each other the hook pivots towards the second magnet to the disengaged position and disengages the latch aperture of the latch on the holding bar.

In some embodiments, the second magnet is activated for one second, two seconds, three seconds, four seconds, five seconds, or six seconds. In some embodiments, the display is a touch screen display. In some embodiments, the device further comprises a bar code. In some embodiments, the device further comprises a power source operatively connected to the microprocessor, the display or the motor. In some embodiments, the device further comprises a microphone. In some embodiments, the device further comprises a universal serial bus port. In some embodiments, the device further comprises a communication port.

BRIEF DESCRIPTION OF THE DRAWINGS

FIG. 1 is a perspective view of the card holding device of the present invention, wherein the door is in the open position.

FIG. 2 is a perspective view of the card holding device of the present invention, wherein the door is in the closed position.

FIG. 7A is a side view of the device of the present invention.

FIG. 7B is a side view of the device of the present invention, wherein the one of the slots is unlocked.

FIG. 8B is a front cross sectional view of the device of the present invention.

DESCRIPTION OF PREFERRED EMBODIMENTS

Figure 3:
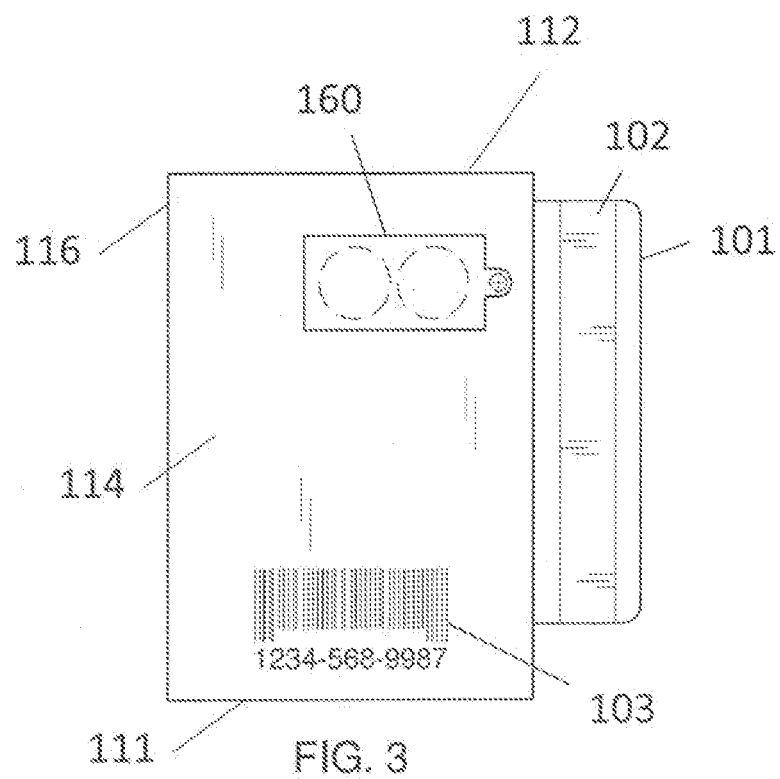
FIG. 3 is a back view of the card holding device of the present invention.
Figure 4:
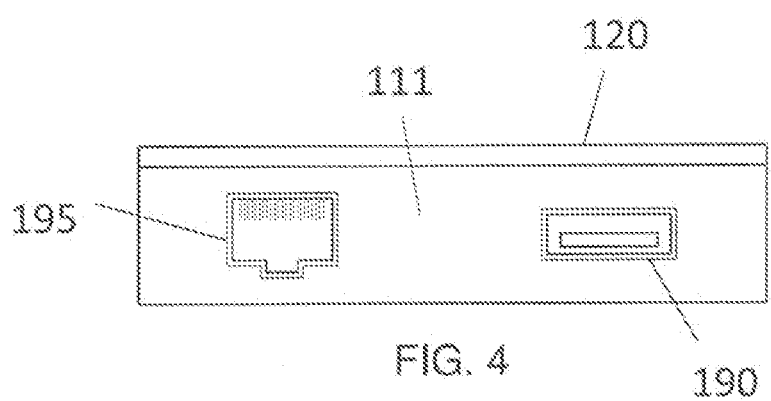
FIG. 4 is a side view of the card holding device of the present invention.
Figure 5:
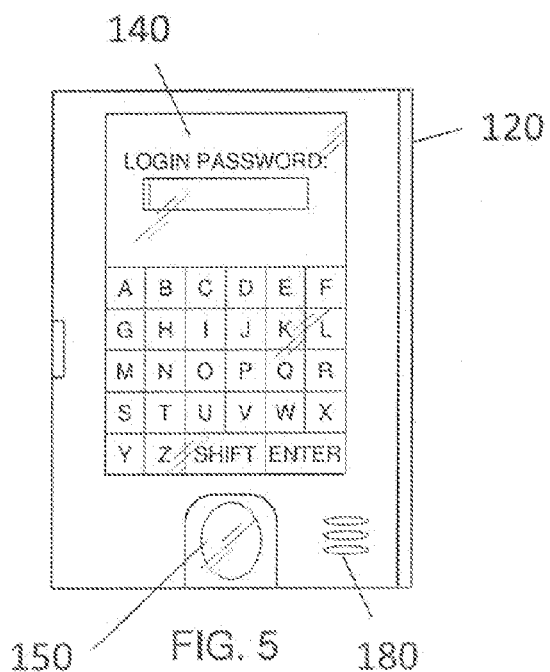
FIG. 5 is a first in-use view of the card holding device of the present invention.
Figure 6:
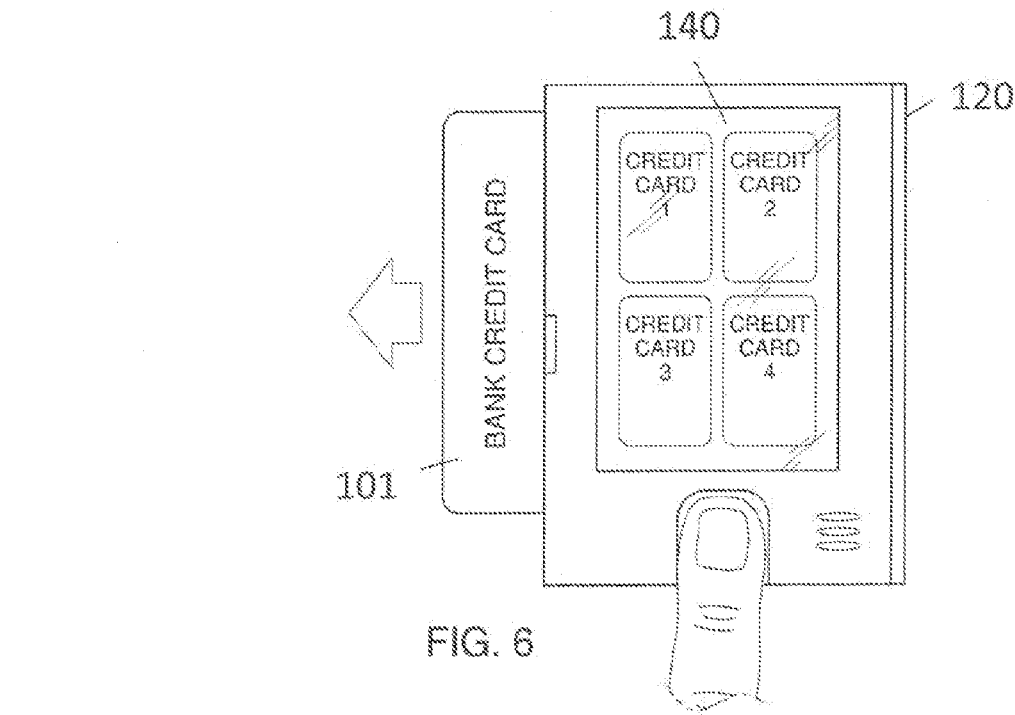
FIG. 6 is a second in-use view of the card holding device of the present invention.

Referring now to FIG. 1-6, the present invention features a card holding device 100 with a security system that allows access only to the owner of the device 100. The device 100 is water tight and water resistant.

The device 100 of the present invention features a housing 110 having a front panel 113, a back panel 114, a first side panel 111, a second side panel 112, a top panel 115, and a bottom panel 116, which together form an inner cavity. The housing 110 may be constructed in a variety of shape and sizes including but not limited to those described herein.

A door 120 (or cover or lid, etc.) is pivotally attached to the housing (e.g., to the front panel of the housing, e.g., at the intersection of the front panel 113 and the bottom panel 116). The door 120 can pivot between at least a first position (e.g., closed position) wherein the door 120 covers the front panel 113 and a second position (e.g., open position) wherein the door 120 is pivoted away from the front panel 113 such that the front panel 113 is completely visible.

Disposed in the top panel 115 of the housing 110 is a plurality of slots 130 (e.g., a first slot, a second slot, a third slot, a fourth slot, a fifth slot, etc.). The slots 130 are sized to allow passage of a card 101 (e.g., a credit card, license) into and out of the inner cavity of the housing 110. FIG. 1 shows a card 101 partially inserted into a slot 130. When the cards 101 are ejected from the inner cavity of the housing 110, the cards 101 can be ejected all the way or partially (e.g., enough to allow for access to the magnetic strip 102).

The device 100 of the present invention further comprises a locking plate 450, which functions to temporarily cover the credit cards 101 stored in the housing 110. The locking plate 450 is positioned near the slots 130 (and may span all the slots 130). The locking plate 450 may extend from near (or at) the first side panel 111 to near (or at) the second side panel 112 of the housing 110. The locking plate 450 can move between multiple positions including an open position and a closed position respectively allowing and preventing access to the cards 101 in the housing 110. As shown in FIG. 7A and FIG. 7B, the locking plate is operatively connected to a motor 410 disposed in the inner cavity of the housing 110 (e.g., via a rack-and-pinion mechanism 420). The motor 410 functions to move the locking plate 450 between the open and closed positions when appropriate. Motors and mechanisms by which motors move doors and the like are well known to one of ordinary skill in the art.

A microprocessor 310 is disposed in the housing 110. The microprocessor 310 comprises programming for performing functions described herein. Such programming is well known to one of ordinary skill in the art. The microprocessor 310 is operatively connected to the motor 410.

A biometric scanner 150 is disposed on the housing 110, for example on the front panel 113 of the housing. Biometric scanners 150 are well known to one of ordinary skill in the art. The biometric scanner 150 can be programmed to recognize a fingerprint, for example a thumb or index finger print. The biometric scanner 150 is operatively connected to the microprocessor 310. The biometric scanner 150 is activated upon recognition of the fingerprint. When the biometric scanner 150 is activated, the scanner 150 sends an activation input signal to the microprocessor 310, which sends a first motor output signal to the motor 410 to cause the motor 410 to move the locking plate 450 to the open position, allowing access to the cards 101 in the housing 110.

Card holding mechanisms are disposed in the inner cavity of the housing 110 (e.g., each card engages a separate card holding mechanism). The card holding mechanisms are adapted to engage the cards 101 when they are inserted via the slots into the inner cavity of the housing 110. Each card holding mechanisms is adapted to push out its card 101 (e.g., eject the card 101) when it is activated. In some embodiments, the card holding mechanisms are spring-loaded mechanisms.

Figure 8A:
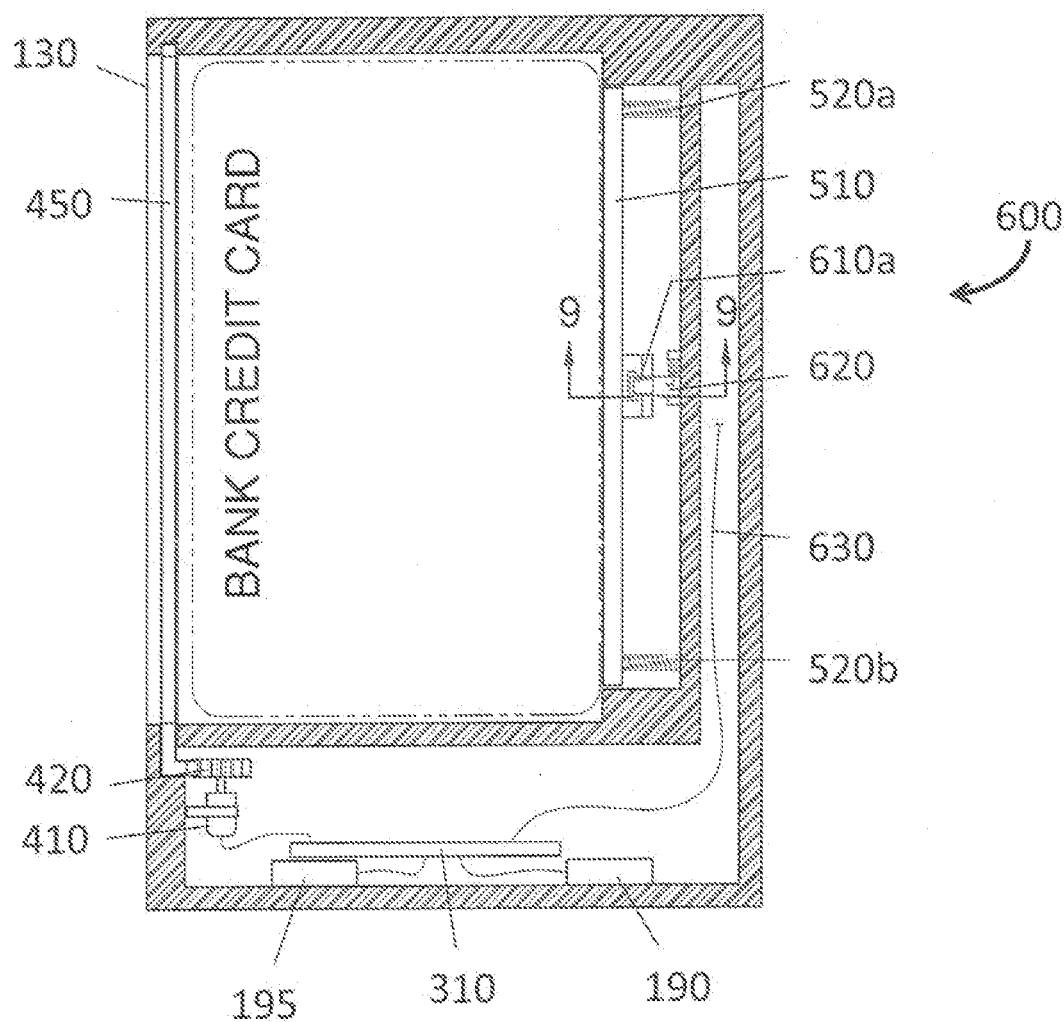
FIG. 8A is a front cross sectional view of the device of the present invention.

As shown in FIG. 8A, each card holding mechanism comprises a holding bar 510 adapted to grip and hold a card 101. The holding bar 510 is positioned in the inner cavity of the housing 110 opposite the slots 130 (e.g., see FIG. 8A, 8B). The holding bar 510 is attached to the side wall 116a of the inner cavity of the housing 110 via a first spring 520a. The holding bar 510 can move between at least a locked position (positioned near or at the side wall 116a of the inner cavity of the housing 110 as shown in FIG. 8A) and an unlocked position (moved towards the slots 130 opposite the side wall 116a of the inner cavity of the housing 110 as shown in FIG. 8B). The holding bar 510 is biased in the unlocked position caused by the first spring 520a. In some embodiments, the holding bar 510 is attached to the side wall 116a of the inner cavity of the housing 110 via a first spring 520a and a second spring 520b (and is biased in the unlocked position caused by the first spring 520a and second spring 520b).

The card holding mechanisms can be locked (preventing movement of the cards) and unlocked (allowing movement of the cards). For example, the holding bar 510 can be secured in the locked position via a locking mechanism 600. In some embodiments, the locking mechanism is a latch mechanism, a magnet mechanism, a clamp mechanism, etc. For example, in some embodiments, a latch 550 with a latch slot 560 is disposed on the holding bar 510 (e.g., the latch 550 faces the side wall of the inner cavity of the housing 110), and a hook 620 (e.g., spring-loaded hook) is disposed on the side wall 116a of the inner cavity of the housing 110. The hook 620 may be pivotally attached to the side wall 116a of the inner cavity of the housing 110 (e.g., via a pivot component 622, e.g., a hinge, etc.). The hook 620 is adapted to temporarily engage the latch 550 via the latch slot 560. When the hook 620 engages the latch 550, the card holding mechanism is locked (e.g. the holding bar 510 is secured in the locked position). The hook 620 can pivot between at least an engaged position (wherein the hook 620 engages the latch 550 via the latch slot 560) and a disengaged position (wherein the hook 620 is pivoted away from the latch 550 can cannot engage the latch slot 560).

Figure 9:
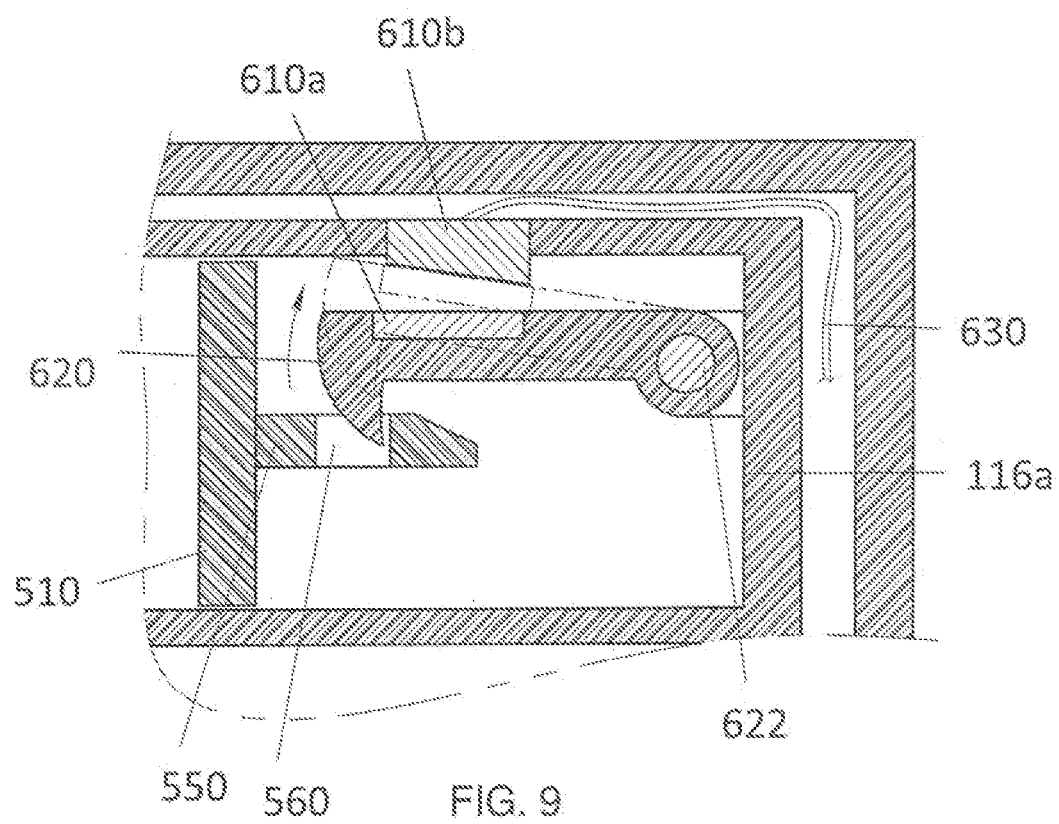
FIG. 9 is a side cross sectional view of the device as shown in FIG. 8A.

A first magnet 610a is disposed on or in the hook 620, and a second magnet 610b is disposed in the inner cavity of the housing 110 near (e.g., adjacent to) the first magnet 610a (e.g. see FIG. 9). The second magnet 610b is fixedly attached in the inner cavity of the housing 110. The magnets 610 may engage each other (e.g., be attracted to each other) when the second magnet 610b is activated. For example, the second magnet 610b is operatively connected to the microprocessor 310 (e.g., via a wire 630). When the microprocessor 310 receives the appropriate input signal, the microprocessor sends an output command to the second magnet 610b to activate the second magnet 610b, thereby causing the first magnet 610a in the hook 620 to be attracted to the second magnet 610b. The attraction between the two magnets 610 causes the hook 620 to pivot towards the second magnet 610a (e.g., to the disengaged position), thus disengaging the latch aperture 560 of the latch 550 on the holding bar 510. With the hook 620 disengaged, the springs 520 push the holding bar 510 to the unlocked position (causing the card 100 to be ejected). The second magnet 610b is activated only for a certain length of time (e.g., one second, two seconds, three seconds, etc.) so that when a user is done with the card 101 he/she can push it into the inner cavity of the housing 110 and the hook 620 is able to re-engage the latch aperture 560 of the latch 550 (e.g., the hook 620 moves back to the engaged position) to secure the card holding mechanism in the locked position (e.g., secure the holding bar 510 in the locked position). The hook 620 may be biased in the engaged position caused by a spring (e.g., the hook 620 may be a spring-loaded hook).

The device 100 also features a power source (e.g., operatively connected to the microprocessor 310, display 140, card holding mechanisms, etc.), for example a battery such as a rechargeable battery (e.g., in a battery compartment 160).

Disposed in the front panel 113 of the housing 110 is a display 140. The display 140 is operatively connected to the microprocessor 310. The display 140 functions to display the cards 101 that are inserted into the inner cavity of the housing 110. The display 140 may be a touch screen display, which is well known to one of ordinary skill in the art (and programming for the microprocessor 310 for a touch screen is also well known to one of ordinary skill in the art).

The display can display icons, which represent each credit card stored in the device 100 (e.g., the display can also be used to program the device to know which cards are being stored). In some embodiments, a user must enter a password to use the display 140. In some embodiments, all the icons (credit cards) can be viewed on the display 140 at once, or the icons can be viewed individually.

When the user selects an icon on the display 140 corresponding to a particular card 101 in a slot 130, the display 140 sends a display input signal to the microprocessor, whereupon the microprocessor 310 activates that particular card holding mechanism to release the card. For example, pressing on a first icon (which corresponds to a card 101 engaged in a first card holding mechanism) causes the display 140 to send a first display input signal to the microprocessor 310 whereupon the microprocessor 310 sends a first eject output command to the first card holding mechanism to cause the locking mechanism 600 of the first card holding mechanism to eject the card 101. Or, in some embodiments, pressing on a second icon (which corresponds to a card 101 engaged in a second card holding mechanism) causes the display 140 to send a second display input signal to the microprocessor 310 whereupon the microprocessor 310 sends a second eject output command to the second card holding mechanism to cause the locking mechanism 600 of the second card holding mechanism to eject the card 101.

In some embodiments, the device 100 further comprises a microphone 180. In some embodiments, the device 100 further comprises a universal serial bus (USB) port 190 for charging or connecting to a computer. In some embodiments, the device 100 further comprises a communication port 195.

In some embodiments, each device 100 is equipped with its own unique bar code 103 (e.g., see FIG. 3).

The disclosures of the following U.S. Patents are incorporated in their entirety by reference herein: U.S. Pat. No. 6,263,090; U.S. Pat. Application No. 2009/0077675; U.S. Pat. Application No. 2009/0066478; U.S. Pat. No. 6,950,540; U.S. Pat. No. 4,852,727; U.S. Design Pat. No. D408,438;

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A card holding device comprising:
(a) a housing (110) having a front panel (113), a back panel (114), a first side panel (111), a second side panel (112), a top panel (115), and a bottom panel (116), which together form an inner cavity;
(b) a door (120) pivotally attached to the front panel (113) of the housing (110), the door (120) can pivot between at least a first position wherein the door (120) covers the front panel (113) and a second position wherein the door (120) is pivoted away from the front panel (113) such that the front panel (113) is completely visible;
(c) a first slot (130) disposed in the top panel (115) of the housing (110), the first slot (130) is sized to allow passage of a card (101) into and out of the inner cavity of the housing (110);
(d) a microprocessor (310) disposed in the housing (110);
(e) a locking plate (450) disposed in the inner cavity of the housing (110) near the first slot (130), the locking plate (450) can move between at least an open position and a closed position respectively allowing and preventing access to the inner cavity of the housing (110) via the first slot (130), the locking plate (450) is operatively connected to a motor (410) disposed in the inner cavity of the housing (110), the motor (410) being operatively connected to the microprocessor (310);
(f) a biometric scanner (150) disposed on the housing (110), the biometric scanner (150) is programmed to recognize a fingerprint of a user, the biometric scanner (150) is activated upon recognition of the fingerprint, wherein when the biometric scanner (150) is activated, the biometric scanner (150) sends an activation input signal to the microprocessor whereupon the microprocessor (310) sends a first motor output signal to the motor (410) to cause the motor (410) to move the locking plate (450) from the closed position to the open position;
(g) a first card holding mechanism disposed in the inner cavity of the housing (110), the first card holding mechanism engages a cards (101) when inserted via the first slot (130) into the inner cavity of the housing (110), the first card holding mechanism comprises:
(i) a holding bar (510), the holding bar (510) temporarily holds a card (101), the holding bar (510) is attached to a side wall (116a) of the inner cavity of the housing via a first spring (520a), the side wall (116a) being opposite the first slot (130), the holding bar (510) can move between at least a locked position positioned near or at the side wall (116a) of the inner cavity of the housing (110) and an unlocked position moved towards the slots (130) opposite the side wall (116a) of the inner cavity of the housing (110), the holding bar (510) is biased in the unlocked position caused by the first spring (520a); and (ii) a locking mechanism (600) functioning to secure the holding bar (510) in the locked position; and (h) a display (140) disposed in the front panel (113) of the housing (110), the display (140) is operatively connected to the microprocessor (310), the display (140) displays a name or an icon for the first slot (130), wherein when a user touches the name or the icon, the display (140) sends a display input signal to the microprocessor (310) whereupon the microprocessor (310) sends a first eject output command to the locking mechanism (600) to cause the locking mechanism (600) to release the holding bar (510) from the locked position thereby allowing the holding bar (510) to move to the unlocked position to eject a card (101) held by the holding bar (510);

wherein the locking mechanism (600) comprises a latch (550) with a latch slot (560), the latch (550) is disposed on the holding bar (510), and a hook (620) disposed on the side wall (116a) of the inner cavity of the housing (110), the hook (620) can pivot between at least an engaged position wherein the hook (620) engages the latch (550) via the latch slot (560) and a disengaged position wherein the hook (620) is pivoted away from the latch (550) and can cannot engage the latch slot (560); when the hook (620) engages the latch (550) the holding bar (510) is secured in the locked position.

2. The device of claim 1, wherein a first magnet (610a) is disposed on the hook (620), and a second magnet (610b) is fixedly attached in the inner cavity of the housing (110) near the first magnet (610a), the second magnet (610b) is operatively connected to the microprocessor (310), when the microprocessor (310) receives the display input signal from the display (140), the microprocessor sends a magnet activation output command to the second magnet (610b) causing activation of the second magnet (610b), activation of the second magnet (610b) causes the first magnet (610a) and second magnet (610b) to be attracted to each other, when the magnets (610) are attracted to each other the hook (620) pivots towards the second magnet (610a) to the disengaged position and disengages the latch aperture (560) of the latch (550) on the holding bar (510).

3. The device of claim 2, wherein the second magnet (610b) is activated for one second, two seconds, three seconds, four seconds, five seconds, or six seconds.

* * * * *